United States Patent
Cloft

(10) Patent No.: US 8,140,242 B2
(45) Date of Patent: Mar. 20, 2012

(54) SYSTEMS AND METHODS INVOLVING MULTIPLEXED ENGINE CONTROL SIGNALS

(75) Inventor: Thomas G. Cloft, Glastonbury, CT (US)

(73) Assignee: United Technologies Corp., Hartford, CT (US)

( * ) Notice: Subject to any disclaimer, the term of this patent is extended or adjusted under 35 U.S.C. 154(b) by 969 days.

(21) Appl. No.: 12/125,223

(22) Filed: May 22, 2008

(65) Prior Publication Data

US 2009/0292437 A1 Nov. 26, 2009

(51) Int. Cl.
*G06F 19/00* (2006.01)

(52) U.S. Cl. .......... 701/100; 701/99; 701/104; 123/492; 123/493; 123/494; 123/520

(58) Field of Classification Search ............ 701/99–100, 701/104; 123/492–494, 520
See application file for complete search history.

(56) References Cited

U.S. PATENT DOCUMENTS

| | | | |
|---|---|---|---|
| 4,380,146 A | 4/1983 | Yannone et al. | |
| 4,506,504 A | 3/1985 | Nick | |
| 5,067,080 A | 11/1991 | Farman | |
| 5,805,828 A | 9/1998 | Lee et al. | |
| 6,047,165 A | 4/2000 | Wright et al. | |
| 6,181,990 B1 | 1/2001 | Grabowsky et al. | |
| 6,360,290 B1 | 3/2002 | Avritch et al. | |
| 6,839,792 B2 | 1/2005 | Feldstein et al. | |
| 6,990,319 B2 | 1/2006 | Wright et al. | |
| 7,103,460 B1 | 9/2006 | Breed | |
| 7,130,772 B2 | 10/2006 | Burnet et al. | |
| 7,167,788 B2 | 1/2007 | Loda et al. | |
| 2009/0312892 A1 * | 12/2009 | Mahoney et al. | 701/3 |

* cited by examiner

*Primary Examiner* — Thomas Black
*Assistant Examiner* — Luke Huynh
(74) *Attorney, Agent, or Firm* — Carlson, Gaskey & Olds, P.C.

(57) ABSTRACT

Systems and methods involving multiplexed engine control signals are provided. In this regard, a representative engine control system for a gas turbine engine includes: a signal relay device operative to receive multiplexed signals from an engine electronic control (EEC), demultiplex the signals, and provide demultiplexed signals to corresponding ones of multiple control devices of the engine.

21 Claims, 2 Drawing Sheets

SYSTEMS AND METHODS INVOLVING MULTIPLEXED ENGINE CONTROL SIGNALS

BACKGROUND

1. Technical Field

The disclosure generally relates to aircraft engine control.

2. Description of the Related Art

Modern gas turbine engines typically incorporate an Electronic Engine Control (EEC), also referred to as a Full Authority Digital Engine Control (FADEC), for controlling engine functions. In this regard, an EEC functions as a primary interface between the gas turbine engine and an aircraft to which the engine is attached. By way of example, an EEC can receive thrust commands from thrust lever resolvers and can alter operating parameters of the engine responsive to those thrust commands. Notably, routing of signals involved in monitoring and controlling engine operating parameters is facilitated by wiring harnesses, which interconnect the EEC and various monitor/control components located about the engine and aircraft.

SUMMARY

Systems and methods involving multiplexed engine control signals are provided. In this regard, an exemplary embodiment of an engine control system for a gas turbine engine having multiple control devices comprises: a signal relay device operative to receive multiplexed signals from an engine electronic control (EEC), demultiplex the signals, and provide demultiplexed signals to corresponding ones of the multiple control devices.

An exemplary embodiment of a method for controlling a gas turbine engine having multiple control devices comprises: multiplexing, at a first location, engine control signals corresponding to the multiple engine control devices; demultiplexing the multiplexed engine control signals at second location; and providing each of the demultiplexed engine control signals to a corresponding one of the multiple control devices.

An exemplary embodiment of a gas turbine engine system comprises: an engine electronic control (EEC) operative to receive and provide information corresponding to engine operating parameters such that a gas turbine engine operates in accordance with the information provided from the EEC; multiple control devices, each of the control devices being operative to perform at least one of: monitoring at least one engine operating parameter, providing information corresponding to the at least one engine operating parameter for use by the EEC, and affecting at least one engine operating parameter; and a signal relay device operative to receive multiplexed signals from the EEC, demultiplex the signals, and provide demultiplexed signals to corresponding ones of the multiple control devices.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Systems and methods involving multiplexed engine control signals are provided, several exemplary embodiments of which will be described in detail. In some embodiments, at least some of the signals communicated to engine control devices are multiplexed for routing. The multiplexed signals (i.e., multiple signals routed along a shared propagation path (e.g., a wire)) are then routed and demultiplexed in a vicinity of the control devices, thereby potentially resulting in space and weight savings over conventional techniques.

Figure 1:
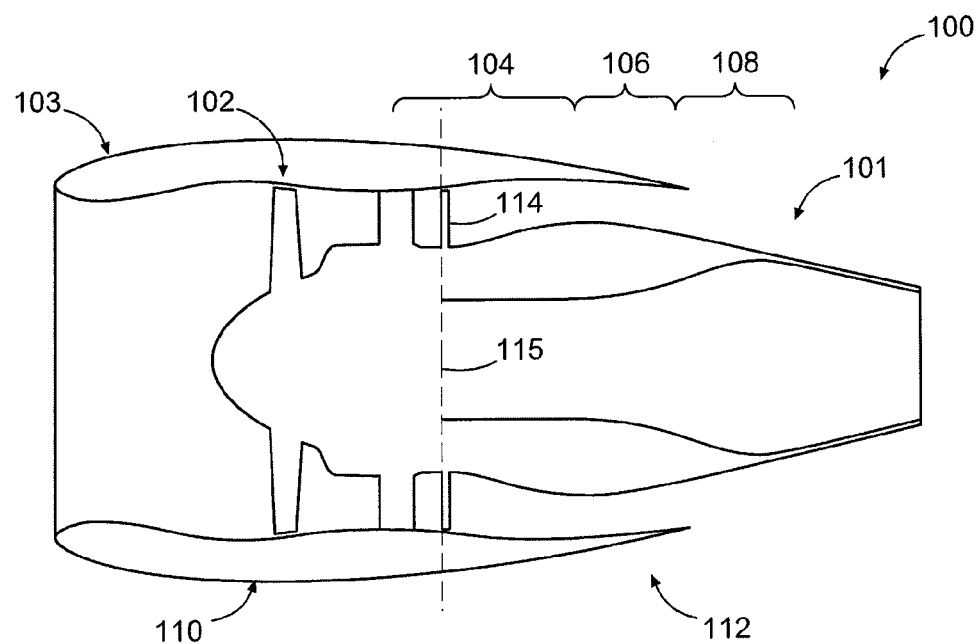
FIG. 1 is a schematic diagram depicting an exemplary embodiment of a gas turbine engine system.

In this regard, reference is made to the schematic diagram of FIG. 1, which depicts an exemplary embodiment of a gas turbine engine system. As shown in FIG. 1, system 100 includes a gas turbine engine 101 (which is configured as a turbofan) that is mounted to a nacelle 103. Engine 101 incorporates a fan 102, a compressor section 104, a combustion section 106 and a turbine section 108. Although depicted as a turbofan gas turbine engine, it should be understood that the concepts described herein are not limited to use with turbofans or other types of gas turbine engines as the teachings may be applied to other types of engines.

The gas turbine engine 101 and nacelle 103 define an inlet compartment 110, which is located generally in a vicinity of the inlet and fan of the engine, and a core compartment 112, which is generally located in a vicinity of the compressor section, the combustion section and the turbine section. In the embodiment of FIG. 1, a barrier 114 partitions the inlet compartment from the core compartment, with much of the engine conduit, e.g., wiring, running between the compartments 110, 112 passing through a typically limited number of openings formed in the barrier. Notably, dashed line 115 generally depicts the boundary between the inlet and core compartments.

Figure 2:
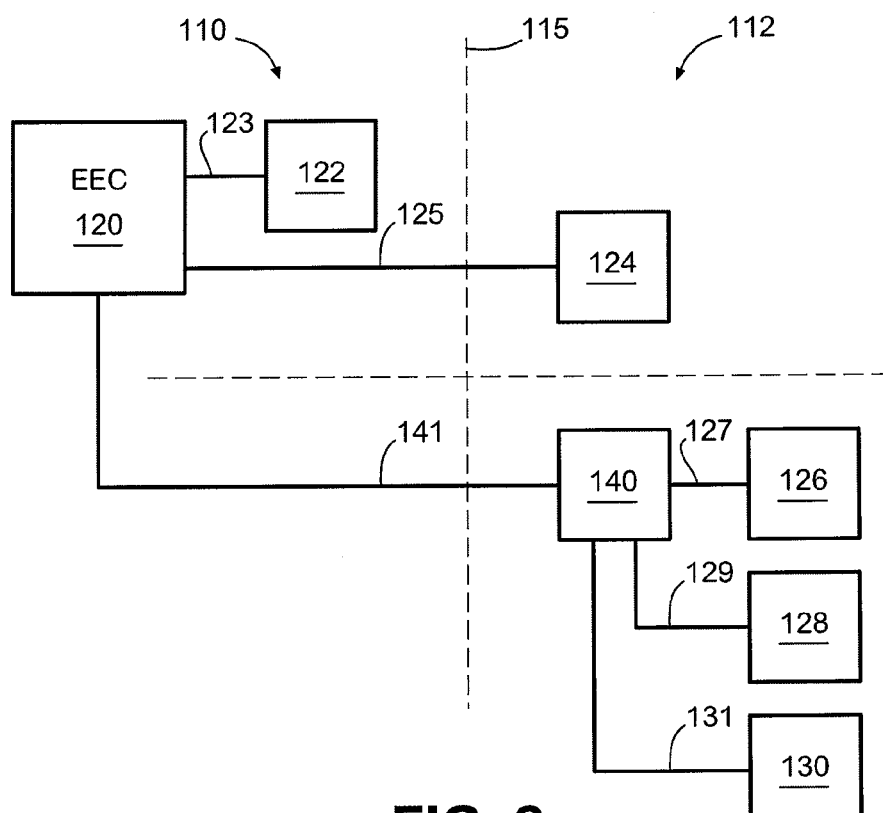
FIG. 2 is a schematic diagram of the embodiment of FIG. 1, showing detail of the engine control devices.

In this regard, at least some of the wiring passing through barrier 114 is associated with an engine electronic control (EEC) 120 (FIG. 2). EEC 120 receives and provides information corresponding to engine operating parameters so that the gas turbine engine operates in accordance with the information provided from the EEC. To facilitate such control, multiple control devices (e.g., devices 122, 124 and 126) are provided. Each of the control devices performs at least one of: monitoring at least one engine operating parameter and providing information corresponding to the at least one engine operating parameter for use by the EEC, and affecting at least one engine operating parameter.

It should be noted that several configurations of control devices are depicted in FIG. 2. For instance, control device 122 is located within the inlet compartment 110, whereas control device 124 is located within the core compartment 112. Each of control devices 122 and 124 communicates directly with the EEC. Specifically, each of the control devices 122 and 124 uses discrete wiring (e.g., wiring harnesses 123 and 125, respectively) for communicating control signals associated with the EEC.

In contrast, control devices 126, 128 and 130 use an intervening signal relay device 140 to communicate with the EEC. Notably, signal relay device 140 receives multiplexed signals from the EEC, demultiplexes those signals, and provides demultiplexed signals to corresponding ones of the control devices. A single wiring harness 141 is interconnected between the EEC and signal relay device 140, and separate wiring harnesses (127, 129 and 131, respectively) are used to interconnect each of the control devices 126, 128 and 130 with the signal relay device.

Multiplexing of some engine control signals may result in the ability to use less wiring and a corresponding reduction in weight. In particular, selection of harness wiring conventionally has resulted in the use of heavier gauge wire than is oftentimes required from a signal transmission perspective so that the wiring harnesses can be robust enough to resist fatigue related failures. This tends to result in adequate excess bandwidth in many wiring harnesses for implementing multiplexed signals. However, safety regulations may limit universal use of multiplexing because discrete wiring may be required between various components.

In this regard, multiplexing of the engine control signals in the embodiment of FIGS. 1 and 2 is limited to control signals associated with non-flight critical ones of the engine control devices. Notably, a flight critical control device is one in which separation of redundant signals is required for flight certification. Based on the configuration presented in FIG. 2, control devices 122 and 124 may be considered flight critical, whereas control devices 126, 128 and 130 are not flight critical. By way of example, device 124 may be a fuel metering unit (FMU), and device 130 may be a turbine cooling air modulating valve. Examples of other flight critical control devices can include, but are not limited to, engine air oil cooler modulating valves, thrust reverser actuation system valves, whereas examples of other non-flight critical control devices can include, but are not limited to, generator air cooler modulating valves.

Figure 3:
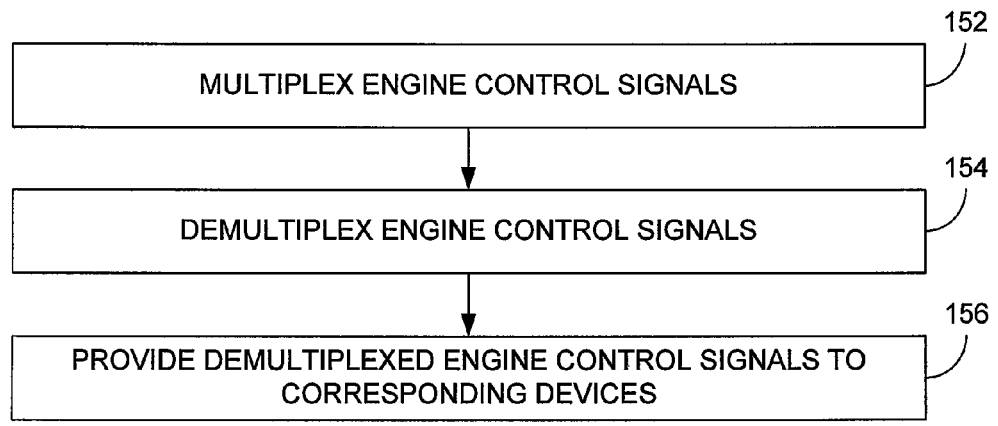
FIG. 3 is a flowchart depicting the functionality of an exemplary embodiment of a gas turbine engine system.

FIG. 3 is a flowchart depicting the functionality of an exemplary embodiment of a gas turbine engine system. As shown in FIG. 3, the functionality (or method) may be construed as beginning at block 152, in which engine control signals corresponding to multiple engine control devices are multiplexed at a first location. In some embodiments, the first location can correspond to the inlet compartment of the engine, with the functionality being performed by an EEC or a device associated with the EEC.

In block 154, the multiplexed engine control signals are demultiplexed at second location. In some embodiments, the second location can correspond to the core compartment, with the functionality being performed by a signal relay device. Notably, an embodiment of a signal relay device can be configured to perform one or more functions involved in signal relay, such as multiplexing, demultiplexing and transmission connectivity, for example. Optionally, an embodiment of a signal relay device can perform one or more of other functions that may not be involved with signal relay.

In block 156, each of the demultiplexed engine control signals is provided to a corresponding one of the multiple control devices. In some embodiments, no intervening devices are located along the transmission paths between the signal relay device and the multiple control devices.

Figure 4:
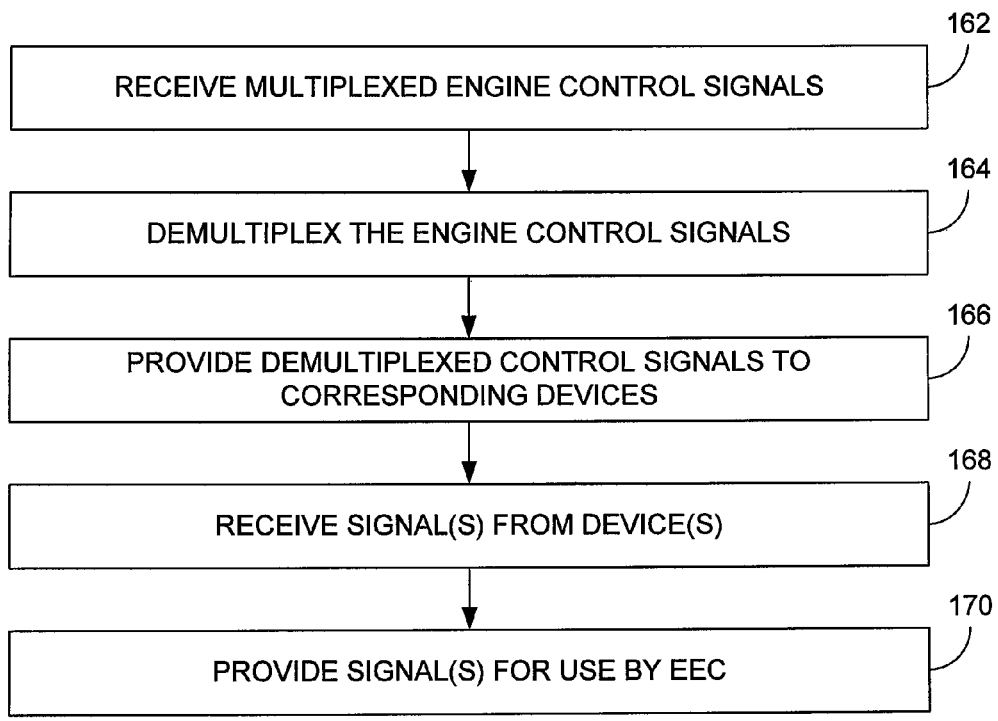
FIG. 4 is a flowchart depicting the functionality of an exemplary embodiment of a signal relay device.

FIG. 4 is a flowchart depicting the functionality of an exemplary embodiment of a signal relay device. As shown in FIG. 4, the functionality (or method) may be construed as beginning at block 162, in which multiplexed engine control signals corresponding to multiple engine control devices are received. In block 164, the multiplexed engine control signals are demultiplexed and, as depicted in block 166, corresponding ones of the demultiplexed signals are provided to designated ones of the engine control devices.

In some embodiments, such a depicted in block 168, one or more signals (e.g., feedback signals) are received from the engine control devices. In block 170, the signals are provided for use by an associated EEC. In some embodiments, providing the signals for use can involve multiplexing the signals so that a multiplexed signal containing information corresponding to the engine control devices is provided to the EEC. Notably, if such functionality is implemented, either the EEC or a device associated with the EEC should be provisioned for demultiplexing the multiplexed signal provided by the signal relay device.

Various functionality, such as that described above in the flowcharts, can be implemented in hardware and/or software. In this regard, a computing device can be used to implement various functionality, such as that depicted in FIGS. 3 and 4.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or non-volatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A gas turbine engine system comprising:
an engine electronic control (EEC) operative to receive and provide information corresponding to engine operating parameters such that a gas turbine engine operates in accordance with the information provided from the EEC;
multiple control devices, each of the control devices being operative to perform at least one of:
monitoring at least one engine operating parameter,
providing information corresponding to the at least one engine operating parameter for use by the EEC, and
affecting at least one engine operating parameter;
a signal relay device operative to receive multiplexed signals from the EEC, demultiplex the signals, and provide demultiplexed signals to corresponding ones of the multiple control devices wherein said multiplexed/demultiplexed signals are for distribution to non-flight critical control systems only.

2. The system of claim 1, further comprising:
a wiring harness operative to interconnect the EEC and a first of the multiple control devices such that the wiring harness facilitates communication of signals between the EEC and the first of the multiple control devices instead of the signal relay device.

3. The system of claim 2, wherein the first of the multiple control devices is a flight critical device requiring separation of redundant signals for flight certification.

4. The system of claim 2, wherein the first of the multiple control devices is a fuel monitoring unit.

5. The system of claim 1, wherein at least two of the multiple control devices receive demultiplexed signals from the signal relay device.

6. The system of claim 5, wherein the at least two of the multiple control devices are non-flight critical control devices such that separation of redundant signals for each of the at least two of the multiple control devices is not required for flight certification.

7. The system of claim 1, wherein at least one of the multiple control devices is configured to be positioned within a core compartment located in a vicinity of a compressor section of a gas turbine engine.

8. The system of claim 7, wherein at least one of the multiple control devices comprises a turbine cooling air modulating valve configured to be positioned in the core compartment.

9. The system of claim 7, wherein the signal relay device is configured to be positioned within the core compartment.

10. The system of claim 9, further comprising a multiplex signal wire interconnecting the signal relay device and the EEC.

11. The system of claim 1, wherein the signal relay device is further operative to receive information from the multiple control devices, multiplex the information and provide multiplexed signals containing the information to the EEC.

12. An engine control system for a gas turbine engine having multiple control devices, said engine control system comprising:
a signal relay device operative to receive multiplexed signals from an engine electronic control (EEC), demultiplex the signals, and provide demultiplexed signals to corresponding ones of the multiple control devices wherein said multiplexed/demultiplexed signals are for distribution to non-flight critical control devices only.

13. The system of claim 12, wherein the signal relay device is further operative to
receive information from non-flight critical control devices only, multiplex the information and provide multiplexed signals containing the information to the EEC.

14. The system of claim 12, further comprising:
a multiplex signal wire operative to interconnect the signal relay device and the EEC; and
non-multiplexed signal wires, each of the non-multiplexed signal wires operative to interconnect the signal relay device and a corresponding one of the multiple control devices.

15. The system of claim 12, further comprising the EEC, the EEC being operative to receive and provide information corresponding to engine operating parameters such that the gas turbine engine operates in accordance with the information provided from the EEC.

16. A method for controlling a gas turbine engine having multiple control devices,
said method comprising:
multiplexing, at a first location, engine control signals corresponding to the multiple engine control devices associated with non-flight critical devices only;
demultiplexing the multiplexed engine control signals at second location; and
providing each of the demultiplexed engine control signals to a corresponding one of the multiple control devices.

17. The method of claim 16, wherein:
the method further comprises providing discrete, non-multiplexed/demultiplexed, control signals to flight critical ones of the multiple control devices.

18. The method of claim 16, further comprising multiplexing information provided by at least two of the multiple control devices such that the information is available for use in controlling operating parameters of the engine.

19. The method of claim 16, wherein the multiplexing is performed by an engine electronic control (EEC).

20. The method of claim 16, wherein the engine is a turbofan gas turbine engine.

21. A gas turbine engine system comprising:
an engine electronic control (EEC) operative to receive and provide information corresponding to engine operating parameters such that a gas turbine engine operates in accordance with the information provided from the EEC;
multiple control devices, each of the control devices being operative to perform at least one of:
monitoring at least one engine operating parameter,
providing information corresponding to the at least one engine operating parameter for use by the EEC,
and
affecting at least one engine operating parameter;
a signal relay device operative to send and receive multiplexed signals from the EEC, demultiplex the signals, and provide demultiplexed/multiplexed signals to corresponding ones of the multiple control devices wherein said multiplexed/demultiplexed signals are for distribution to non-flight critical control systems only.

* * * * *